United States Patent
Coran et al.

(10) Patent No.: US 12,090,701 B2
(45) Date of Patent: Sep. 17, 2024

(54) SUPPORT APPARATUS FOR SUPPORTING AT LEAST ONE NECK MOLD OF A CONTAINER IN AN INJECTION BLOW MOLDING MACHINE

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Massimo Coran, Spresiano (IT); Marco Frare, San Fior (IT); Matteo Zoppas, Conegliano (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 255 days.

(21) Appl. No.: 17/595,418

(22) PCT Filed: May 14, 2020

(86) PCT No.: PCT/IB2020/054559
§ 371 (c)(1),
(2) Date: Nov. 16, 2021

(87) PCT Pub. No.: WO2020/234699
PCT Pub. Date: Nov. 26, 2020

(65) Prior Publication Data
US 2022/0219373 A1    Jul. 14, 2022

(30) Foreign Application Priority Data
May 17, 2019   (IT) .................. 102019000006961

(51) Int. Cl.
B29C 49/28        (2006.01)
B29C 49/06        (2006.01)
(Continued)

(52) U.S. Cl.
CPC ........ B29C 49/28008 (2022.05); B29C 49/06 (2013.01); B29C 49/36 (2013.01);
(Continued)

(58) Field of Classification Search
CPC ...... B29C 49/28008; B29C 2049/4861; B29C 2049/5663; B29C 49/36
See application file for complete search history.

(56) References Cited

U.S. PATENT DOCUMENTS

| | | |
|---|---|---|
| 3,768,944 A | 10/1973 | Ninneman |
| 4,457,689 A | 7/1984 | Aoki |

(Continued)

FOREIGN PATENT DOCUMENTS

| | | | |
|---|---|---|---|
| EP | 0435347 A2 | | 7/1991 |
| JP | 08244103 A | * | 9/1996 |
| JP | 2017213912 A | | 12/2017 |

OTHER PUBLICATIONS

International Search Report, dated Sep. 9, 2020, for corresponding International Patent Application No. PCT/IB2020/054559.

*Primary Examiner* — Robert B Davis
(74) *Attorney, Agent, or Firm* — Troutman Pepper Hamilton Sanders LLP

(57) ABSTRACT

A support apparatus (3) for supporting at least one neck mold (4) of a plastic container, the apparatus being adapted to be fastened to a lower surface of a rotating device (2) of an injection blow molding machine, said support apparatus comprising—a pair of plates (5) defining a longitudinal axis (X), said plates (5) being adjacent to each other along the axis (X) and separable from each other transversely to said axis (X), and being kept adjacent in a normally closed state by elastic means (6); wherein each plate (5) is provided with at least one respective recess positioned so that, when the plates (5) of said pair of plates are in the normally closed state, at least two recesses are adjacent to each other along said longitudinal axis (X) so as to define a seat for a neck mold (4) comprising a pair of split molds (7), each split mold (7) being capable of being accommodated in a recess of a respective plate (5); —a pair of side guides (8) transverse to
(Continued)

said longitudinal axis (X), adapted to be fastened to said lower surface of the rotating device (2), each side guide (8) being adapted to support a respective end of the pair of plates (5) from the bottom; wherein the side guides (8) are provided with a respective locking system (9) for locking or unlocking the pair of plates (5) to/from said pair of side guides (8) so that, in an unlocking position, the pair of plates (5) can be extracted transversely to the axis (X) thereof by sliding on the side guides (8).

18 Claims, 14 Drawing Sheets

(51) Int. Cl.
  *B29C 49/36* (2006.01)
  *B29C 49/48* (2006.01)
  *B29C 49/56* (2006.01)
  *B29L 31/00* (2006.01)

(52) U.S. Cl.
  CPC .............. *B29C 49/48* (2013.01); *B29C 49/56* (2013.01); *B29C 2049/4861* (2013.01); *B29C 2049/5663* (2022.05); *B29L 2031/712* (2013.01)

(56) References Cited

U.S. PATENT DOCUMENTS

| | | |
|---|---|---|
| 2012/0294974 A1 | 11/2012 | Yokobayashi |
| 2015/0290865 A1* | 10/2015 | Horigome ............... B29C 33/30 425/522 |

* cited by examiner

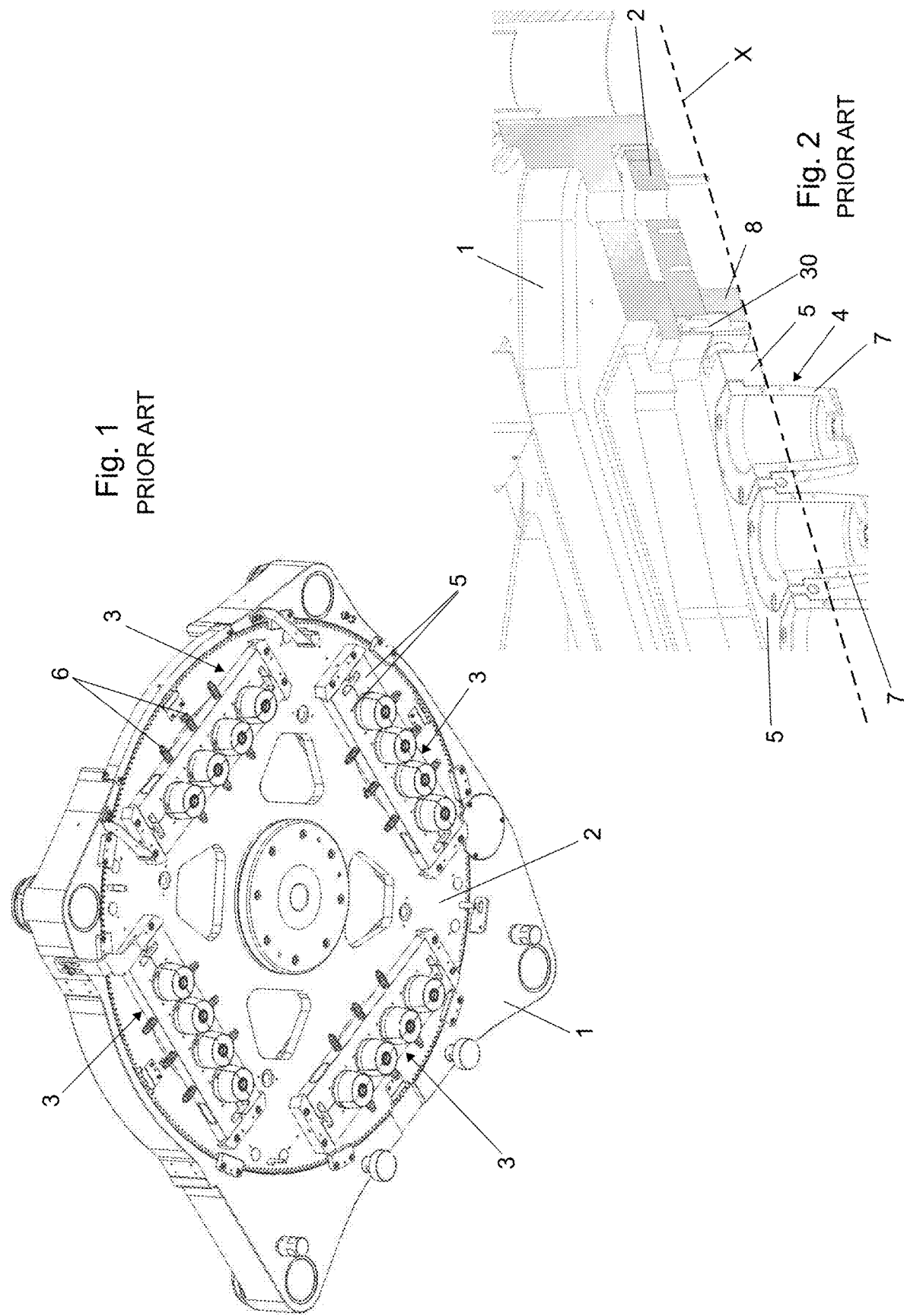

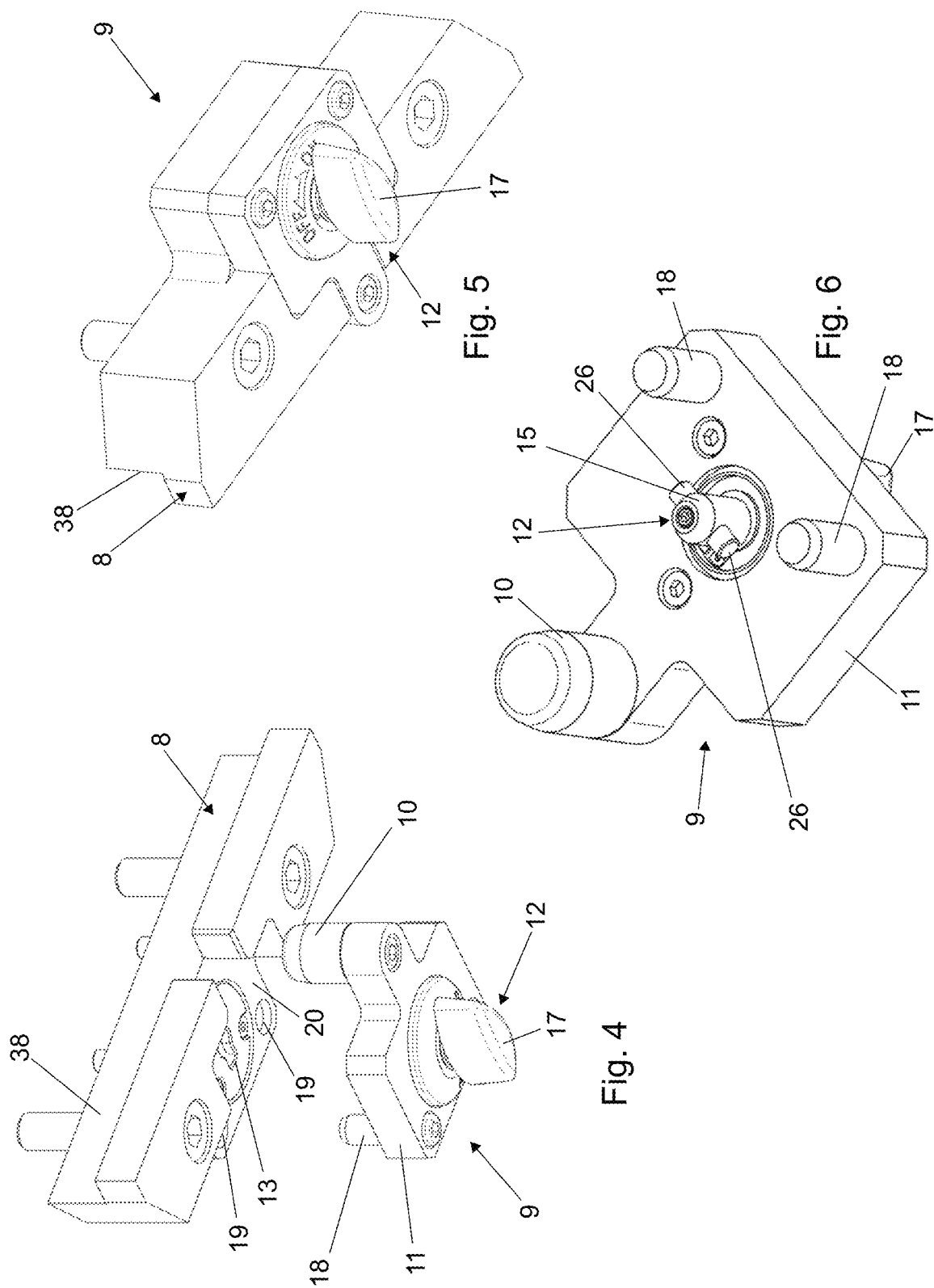

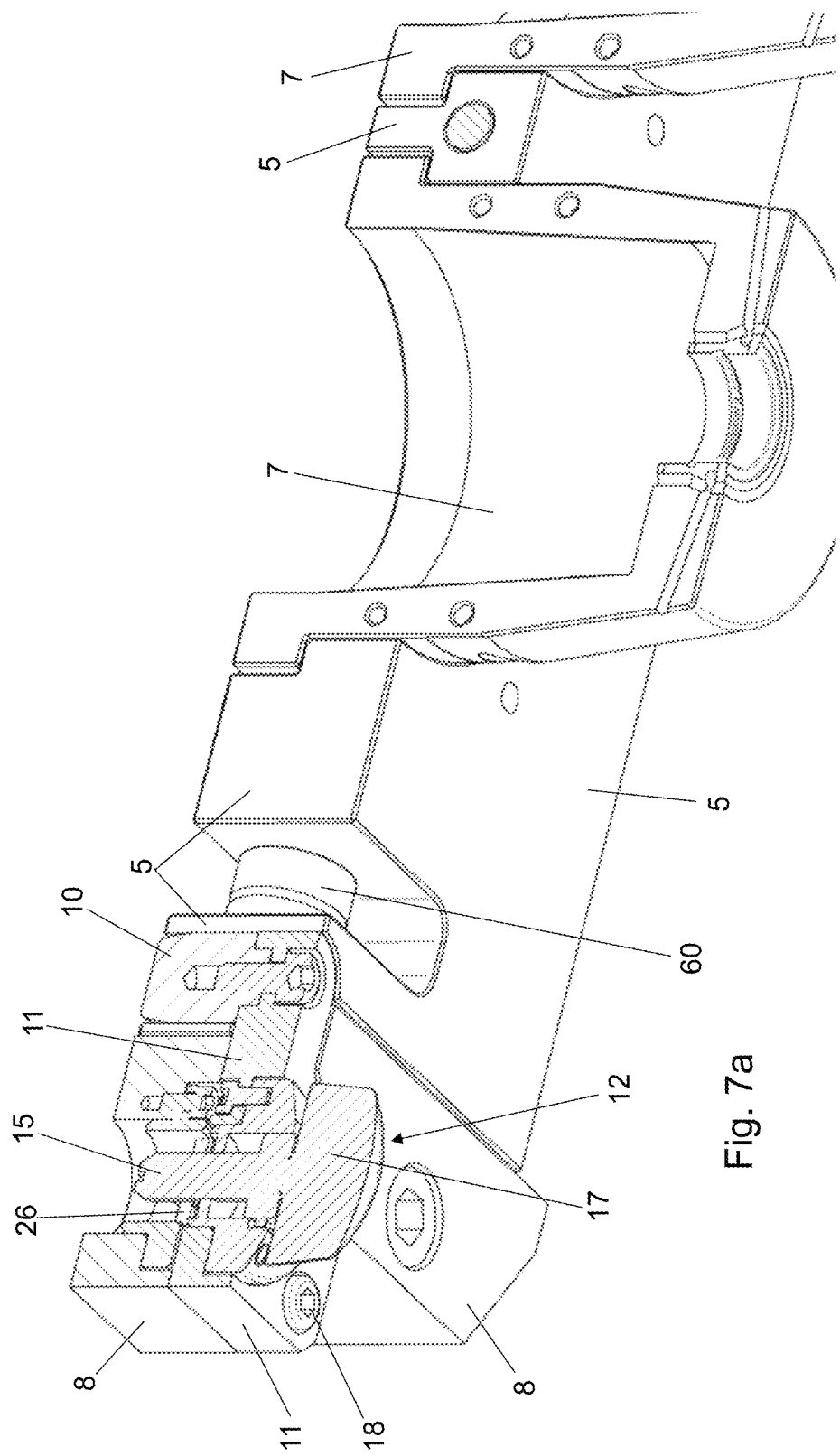

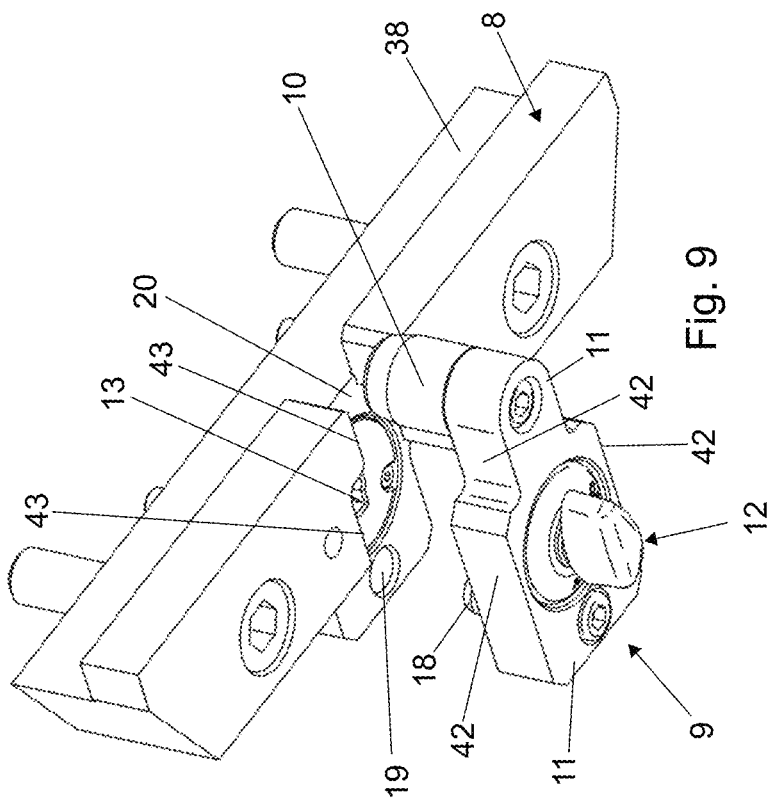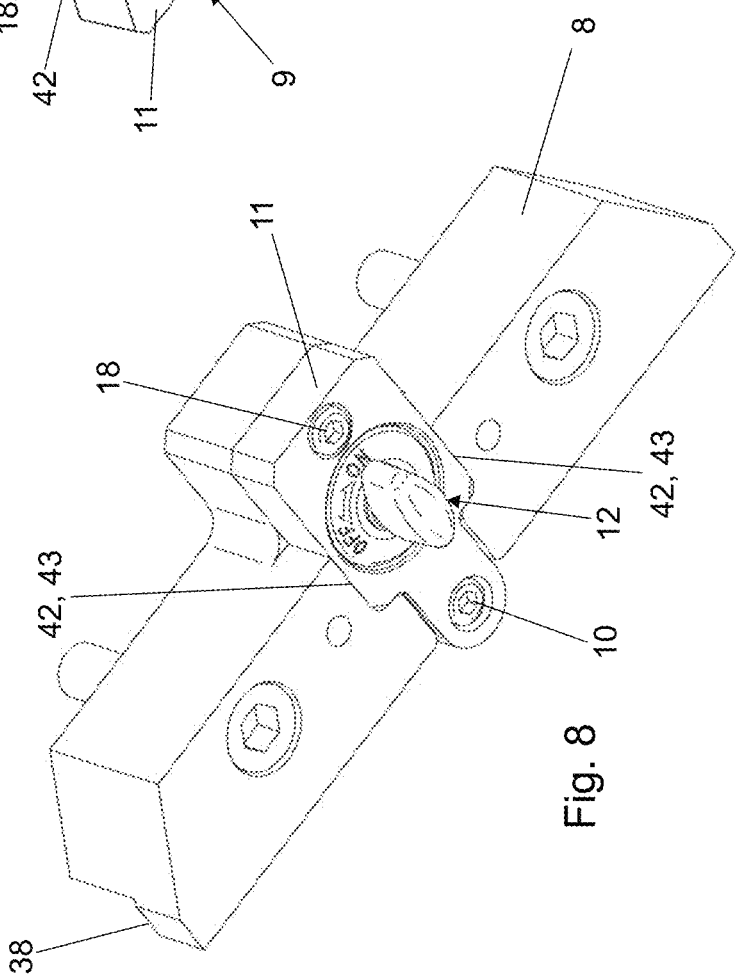

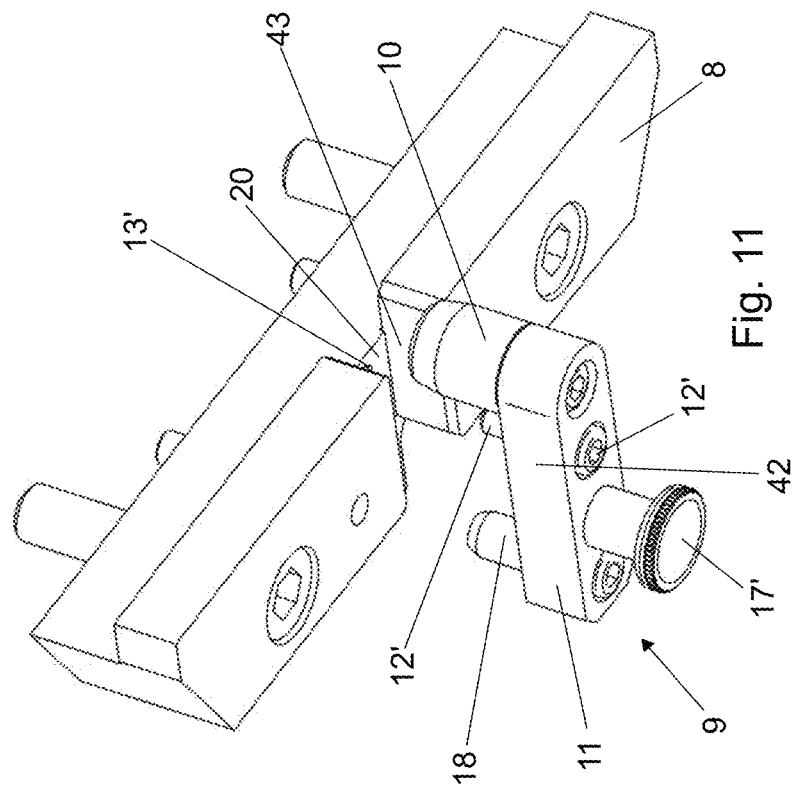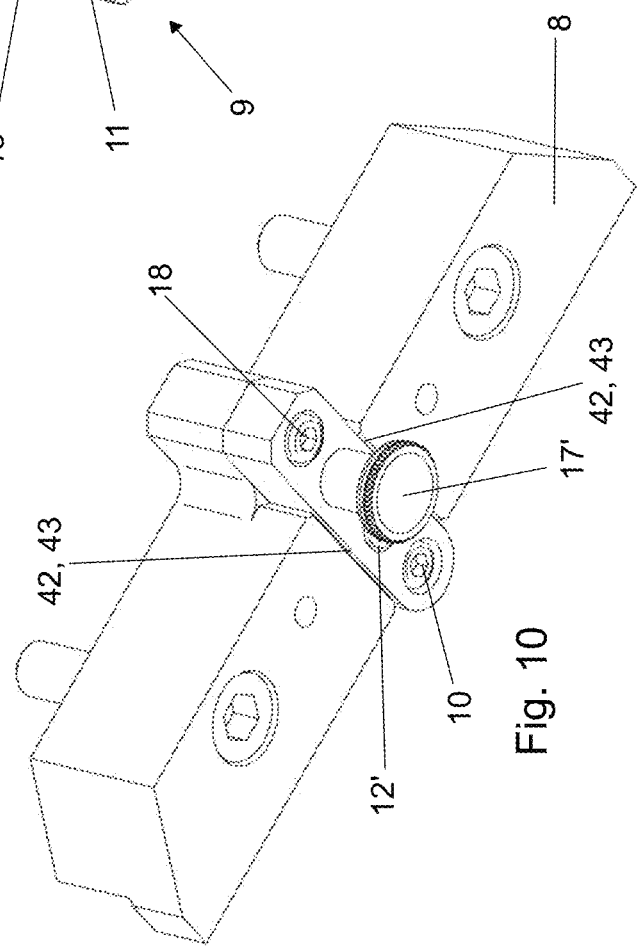

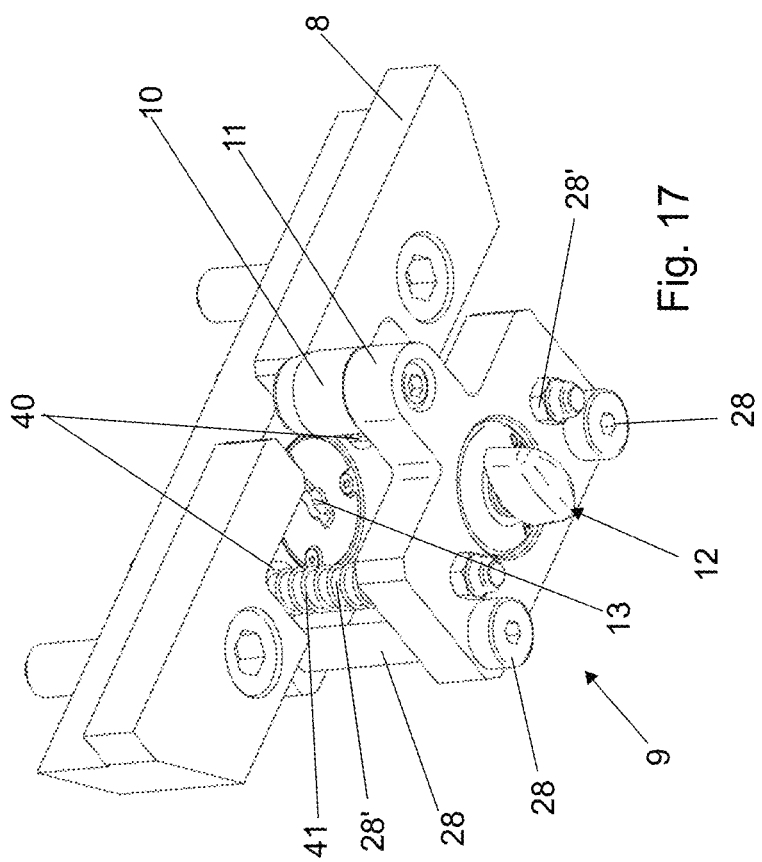
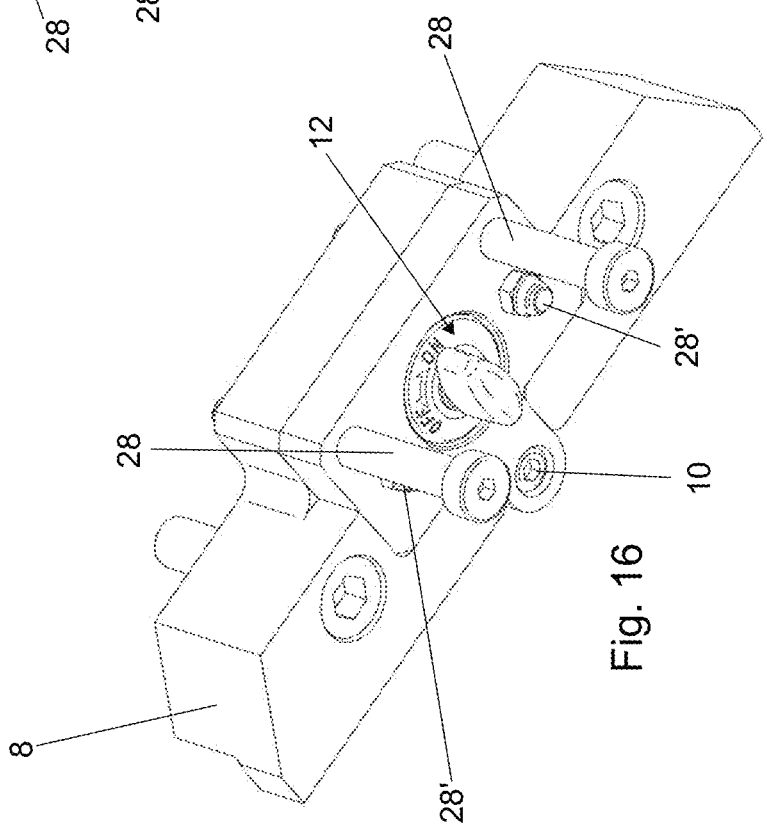

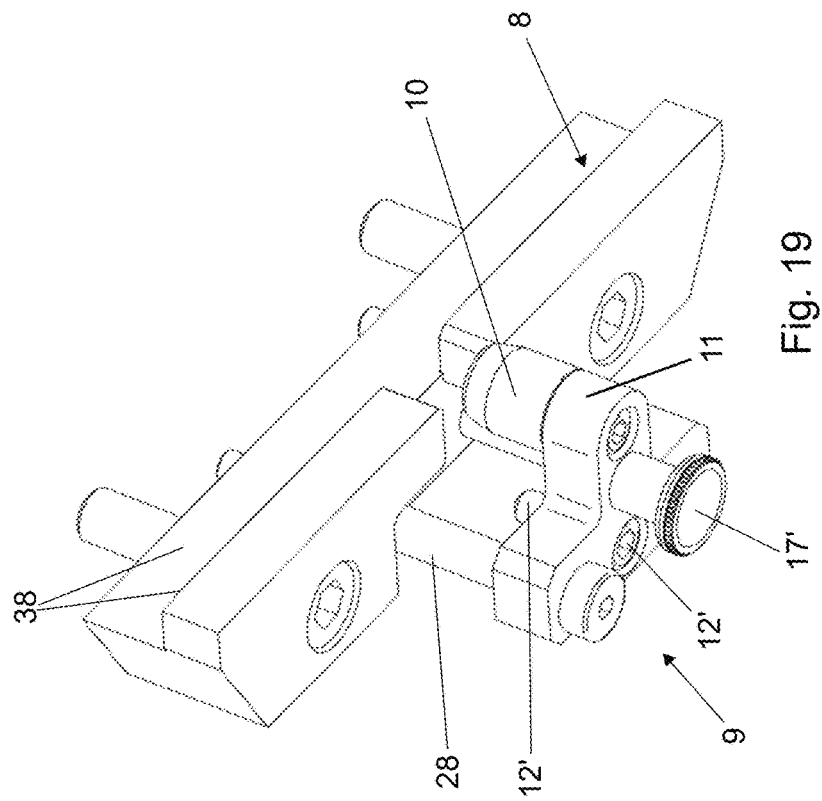
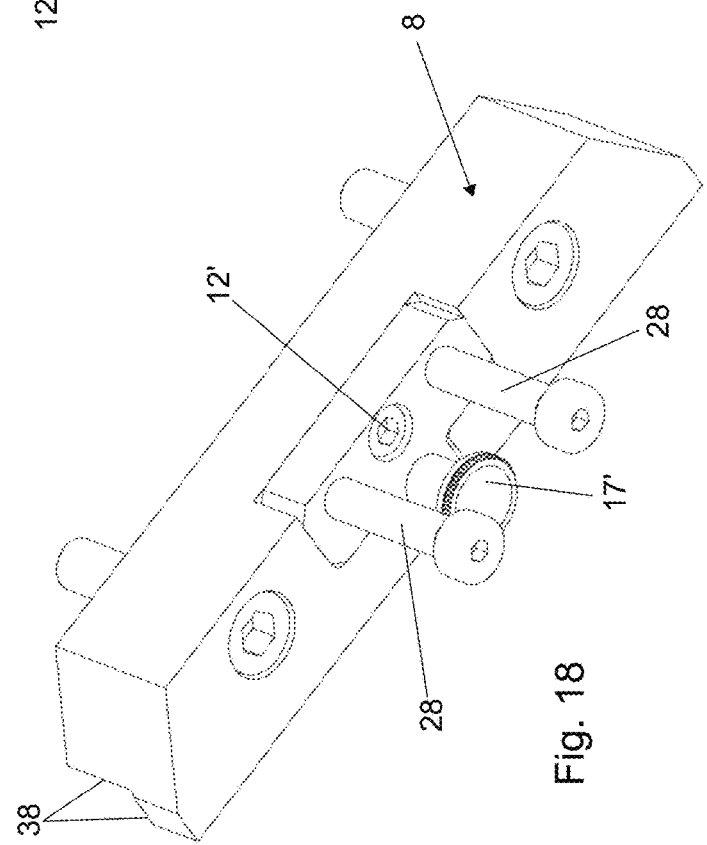

SUPPORT APPARATUS FOR SUPPORTING AT LEAST ONE NECK MOLD OF A CONTAINER IN AN INJECTION BLOW MOLDING MACHINE

CROSS REFERENCE TO RELATED APPLICATIONS

This application is a national phase of PCT application No. PCT/IB2020/054559, filed May 14, 2020, which claims priority to IT patent application No. 102019000006961, filed May 17, 2019, all of which are incorporated herein by reference thereto.

FIELD OF THE INVENTION

The present invention relates to a support apparatus for supporting at least one neck mold of a plastic container at a lower surface of a rotating device of an injection blow molding machine. Such a machine comprises at least two support apparatuses of neck molds removably fastened to the lower surface of the rotating device.

The rotating device is adapted to rotate in an intermittent manner to transport, in sequence, each support apparatus at a first station for injection-molding preforms and at a second station for blow-molding containers from said preforms.

BACKGROUND ART

A known type of injection blow molding machine is shown in FIGS. 1 and 2.

The support apparatuses 3 of the neck molds 4 are removably fastened to a lower surface of the rotating device 2 and each comprise:
- a pair of plates 5 (split plates) defining a longitudinal axis X, adjacent along the axis X and separable from each other transversely to said axis X, and kept adjacent along the axis X in a normally closed state by means of elastic means 6;
- neck molds 4 each comprising a pair of split molds 7, each split mold 7 of the pair of split molds being accommodated in an opening of a respective plate 5 of the pair of plates, whereby the split molds 7 of each pair of split molds are adjacent to each other along the axis X when the plates 5 of said pair of plates are in the normally closed state;
- a pair of side guides 8 transverse to said axis X, screwed to the lower surface of the rotating device 2, each side guide 8 supporting a respective end of the pair of plates 5 from the bottom.

Centering pins 30, arranged vertically and projecting from the lower surface of the rotating device 2, are fastened on the rotating device 2 to center the pairs of plates 5 with respect to the side guides 8. In particular, a centering pin 30 is provided at each side guide 8.

The pair of plates 5, provided with the neck molds 4 and also known as lip-holder bar, is inserted from the bottom so that the fixed centering pins 30 are received in respective end holes of the pair of plates.

Each end hole, in particular, is defined by the combination of two recesses, each recess being made in a respective plate 5 of the pair of plates.

Therefore, when the two plates 5 are kept adjacent to each other along the axis X, in the normally closed state thereof, the two recesses in each end of the pair of plates 5 define a respective end hole.

Disadvantageously, a first operator is required to lift the pair of plates 5, centering the end holes on the centering pins 30, in order to assemble a pair of plates on the rotating device.

While this first operator keeps the pair of plates 5 on the centering pins 30, a second operator first screws the fastening screws to fasten a first side guide to the rotating device 2 and then screws the fastening screws to also fasten the second side guide to the rotating device 2.

Just as disadvantageously, if a pair of plates 5 is to be replaced, it is required for a first operator to manually support the pair of plates 5 while a second operator unscrews the fastening screws of the two side guides 8.

Once the second operator has detached the side guides 8 from the rotating device 2, the first operator can remove the pair of plates 5 by vertically lowering it to release it from the centering pins 30.

Considering that a pair of plates 5 can weigh up to about 30 kg, the presence of two operators is required both for locking the pair of plates 5 to the rotating device and for unlocking and removing the pair of plates 5 from the rotating device.

Further, the times for these operations are very long.

At least ten minutes and the use of two operators are necessary to replace one pair of plates alone on the rotating device. In addition to maintenance operations, this replacement becomes necessary also when a change of format of the neck of the containers to be produced is to be carried out.

Therefore, the need is felt to make a support apparatus for neck molds in an injection blow molding machine which allows the aforesaid drawbacks to be overcome.

SUMMARY OF THE INVENTION

It is a primary object of the present invention to make a support apparatus for supporting at least one neck mold of a plastic container, in particular applicable to a rotating device of an injection blow molding machine, which allows a simpler and quicker replacement of the pairs of plates, or lip-holder bars, of the rotating device.

It is another object of the invention to make a support apparatus in which, in some embodiments thereof, the use of external tools is no longer required to disassemble and assemble the pairs of plates.

Therefore, the present invention proposes to achieve at least one of the above-mentioned objects by making a support apparatus for supporting at least one neck mold of a container made of plastic material, the apparatus being adapted to be fastened to a lower surface of a rotating device of an injection blow molding machine of plastic containers, said support apparatus comprising
- a pair of plates defining a longitudinal axis X, said plates being adjacent to each other along the longitudinal axis X and separable from each other transversely to said longitudinal axis X, and being kept adjacent in a normally closed state by means of elastic means; wherein each plate is provided with at least one respective side recess positioned so that, when the plates of said pair of plates are in the normally closed state, at least two side recesses are adjacent to each other along said longitudinal axis X so as to define a seat for a neck mold comprising a pair of split molds, each split mold being capable of being accommodated in a side recess of a respective plate;
- a pair of side guides transverse to said longitudinal axis X, adapted to be fastened to said lower surface of the rotating device, each side guide being adapted to support a respective end of the pair of plates from the bottom;

wherein the side guides are provided with a respective locking system for locking or unlocking the pair of plates to/from said pair of side guides so that, in an unlocking position, the pair of plates can be extracted transversely to the longitudinal axis X thereof by sliding on the side guides.

Another aspect of the invention relates to an injection blow molding machine for plastic containers, the machine comprising a fixed base plate;

a rotating device, arranged below and movably supported by said fixed base plate, at least two support apparatuses, as described above, removably fastened to a lower surface of said rotating device;

wherein the rotating device is adapted to rotate in an intermittent manner to transport, in sequence, each support apparatus at a first station for injection-molding plastic preforms and at a second station for blow-molding containers from said preforms;

wherein each support apparatus comprises at least one neck mold comprising a pair of split molds, each split mold of the pair of split molds being accommodated in a side recess of a respective plate of the pair of plates, whereby the split molds are adjacent to each other along said axis X when the plates of said pair of plates are in the normally closed state.

According to a further aspect of the invention, a method is provided for replacing a pair of plates from a support apparatus of the aforesaid injection blow molding machine, said method comprising the following steps:

a) unlocking the pair of plates from the corresponding side guides by means of the respective locking systems;

b) extracting the pair of plates transversely to the longitudinal axis X thereof by sliding said pair of plates on the side guides;

c) inserting a new pair of plates by sliding said new pair of plates on said side guides transversely to the longitudinal axis X thereof;

d) locking the new pair of plates to the corresponding side guides by means of the respective locking systems;

preferably wherein, in step b), the extraction is completed by also sliding the pair of plates on respective side extraction guides, each side extraction guide being fastened to the fixed base plate and aligned to the corresponding side guide;

and preferably wherein, in step c), the insertion of the new pair of plates occurs by first sliding said new pair of plates on said side extraction guides and then on the corresponding side guides.

Advantageously, in order to remove a pair of plates, or lip-holder bar, it is sufficient to operate the quick coupling devices arranged at each side guide of the pair of plates, or unscrew only one fastening screw at each side guide, to allow the disengagement of the locking pin from the end recesses of the pair of plates in the normally closed state thereof, each end recess being defined by two end half-recesses, each end half-recess being provided in an end of a respective plate of the pair of longitudinal plates.

At this point, the lip-holder bar can be removed by sliding it towards the outside of the machine along the fixed side guides, which do not require being unscrewed from the rotating device.

Advantageously, in some embodiments of the invention, the use of external tools is no longer required for disassembling and assembling the pairs of plates, by virtue of the presence of an extremely simple assembly and disassembly system.

The machine of the invention allows the replacement times of each pair of plates, or each lip-holder bar, to be reduced to about two minutes, while requiring the use of only one operator.

Another advantage of the solution of the present invention is the fact that it can be easily applied also on existing machines, because:

additional work may not be required on the rotating device, rather the existing holes are taken advantage of;

constructional modifications on the existing lip-holder bars may not be required.

The dependent claims describe preferred embodiments of the invention.

BRIEF DESCRIPTION OF THE FIGURES

Further features and advantages of the invention shall be more apparent in light of the detailed description of preferred, but not exclusive, embodiments of an injection blow molding machine partially disclosed by way of explanation and not by way of limitation, with the aid of the enclosed drawings, in which:

FIG. 1 shows a perspective view of an example of part of a machine of the background art:

FIG. 2 shows a perspective sectional view of a part of the machine of FIG. 1;

FIG. 4 shows a first partially exploded perspective view of a first variant of part of the apparatus of the invention in the machine of FIG. 3;

FIG. 5 shows a second perspective view of the first variant of FIG. 4;

FIG. 6 shows a perspective view of smeo components shown in FIG. 5;

FIGS. 7a and 7b show a sectional view of said first variant of part of the apparatus of the invention, in two corresponding positions;

FIG. 8 shows a first perspective view of a second variant of said part of the apparatus of the invention;

FIG. 9 shows a second partially exploded perspective view of the second variant of FIG. 8;

FIG. 10 shows a first perspective view of a third variant of said part of the apparatus of the invention;

FIG. 11 shows a second partially exploded perspective view of the third variant of FIG. 10;

FIG. 16 shows a first perspective view of a fifth variant of said part of the apparatus of the invention;

FIG. 17 shows a second partially exploded perspective view of the fifth variant of FIG. 16;

FIG. 18 shows a first perspective view of a sixth variant of said part of the apparatus of the invention;

FIG. 19 shows a second partially exploded perspective view of the sixth variant of FIG. 18;

The same reference numerals in the Figures identify the same elements or components.

DETAILED DESCRIPTION OF PREFERRED EMBODIMENTS OF THE INVENTION

Figure 3:
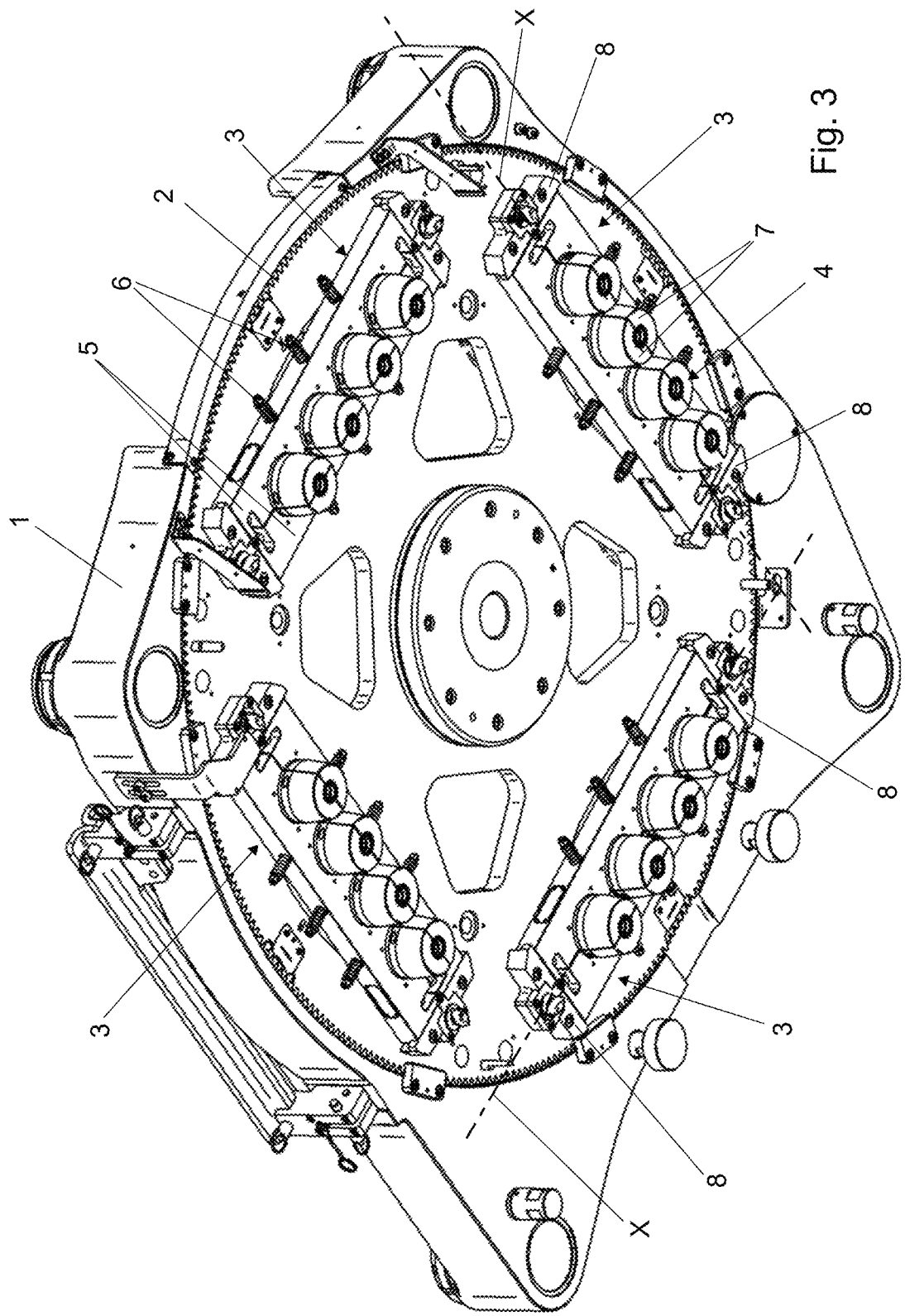
FIG. 3 shows a perspective view of a rotating device of a machine in accordance with the invention.

With reference to FIGS. from 3 to 21, there is shown a part of an injection blow molding machine for making containers made of thermoplastic material, such as PET, PEN or other suitable material, as well as mixtures thereof.

The injection blow molding machine for plastic containers, only partially shown in FIG. 3, comprises
- a fixed base plate 1;
- a rotating device 2 arranged below and movably supported by the fixed base plate 1,
- at least two support apparatuses 3, each for supporting at least one neck mold 4 of a plastic container, the support apparatuses 3 being removably fastened to the lower surface of the rotating device 2.

The rotating device 2, for example disk-shaped, is adapted to rotate in an intermittent manner to transport each support apparatus 3 from one working station to another. In the case of two support apparatuses 3, the rotating device 2 rotates in an intermittent manner to move the individual support apparatus 3 from an injection molding station for injection molding plastic preforms to a blow-molding station for blow molding containers starting from said preforms, and vice versa.

Four support apparatuses 3 are provided in the example in FIG. 3. Here, the rotating device 2 rotates in an intermittent manner to move the individual support apparatus 3, in sequence, from a first injection molding station of preforms to a second station for adjusting the temperature of the preforms; from said second station to a third blow molding station of the containers; and from said third station to a fourth ejection station of the containers. In this case, the support apparatuses 3, in particular the centers of gravity of said apparatuses, are arranged on the rotating device 2 at an angular distance of 90° from one another.

The different working stations are not herein described because they are of the known type.

In the example in FIG. 3, each support apparatus 3 comprises a pair of longitudinal split plates 5 defining a longitudinal axis X, said plates 5 being kept adjacent to each other along the longitudinal axis X in a normally closed state by elastic means 6, and separable from each other transversely to said longitudinal axis X.

Figure 7B:
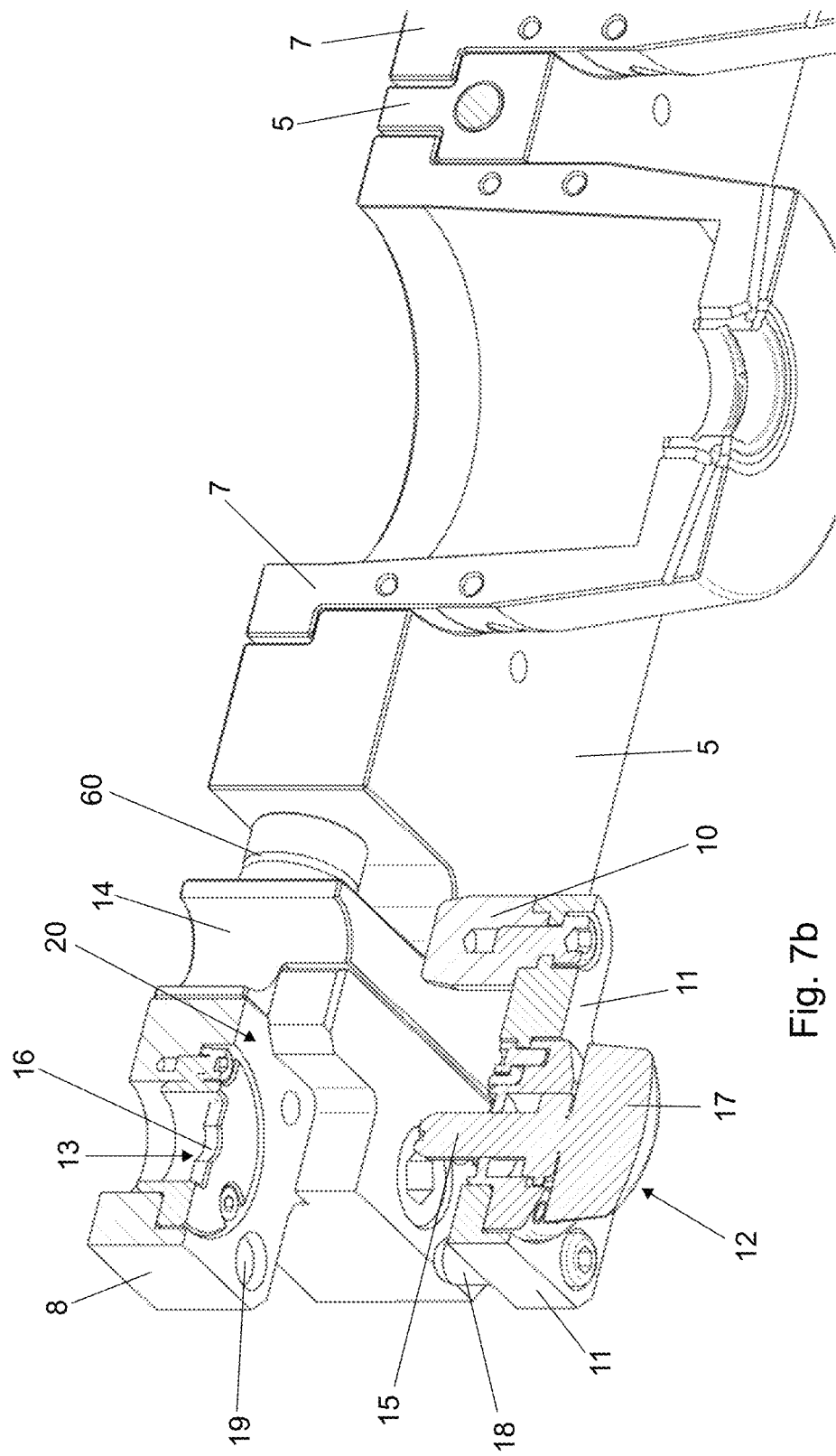

This means that if a force for separating or opening the plates 5 to each other transversely, preferably orthogonally, to the axis X is not applied, the plates 5 are adjacent to each other along the axis X, and therefore are in a closed state. This force of separation, for example, can be applied to the respective two ends of the pair of plates by means of a corresponding wedge which is inserted between two rollers 60, one for each plate end (only one roller 60 is shown in FIG. 7b).

The elastic means 6, herein not described because inherently known, comprise springs arranged on the outer longitudinal edges of each plate 5.

Each plate 5 of the pair of plates, preferably rectangular-shaped, is provided, along an inner longitudinal edge, with respective, substantially semi-circular, side recesses positioned so that, when the plates 5 of the pair of plates are in the normally closed state, the side recesses are two-by-two adjacent to each other defining corresponding seats, for example substantially circular seats, for accommodating a respective neck mold 4.

Each neck mold 4, which is suitable for molding the neck of a preform, comprises a pair of split molds 7, each split mold 7 being accommodated in a side recess of a respective plate 5 of the pair of plates, whereby the two split molds 7 are adjacent to each other along the axis X when the plates 5 of said pair of plates are in the normally closed state. FIG. 3 provides a plurality of neck molds 4, for example four. The number of neck molds 4 can alternatively be less or greater than four.

Each support apparatus 3 further comprises a pair of side guides 8 transverse to the longitudinal axis X and fastened to the lower surface of the rotating device 2. Each side guide 8 is adapted to support, from the bottom, by means of a shoulder made thereon, a respective end of the pair of longitudinal plates 5.

Advantageously, the side guides 8 are provided with a respective locking system 9 for locking/unlocking the pair of plates 5 to/from the pair of side guides 8 so that, in an unlocking position, the pair of plates 5 can be extracted transversely to the longitudinal axis X thereof by sliding on the side guides 8, in particular by sliding on the horizontal surface of the shoulder provided on said side guides.

In all the embodiments of the invention, the locking system 9 comprises a base 11 provided, at an end thereof, with a locking pin 10 projecting from said base, and further provided with fastening means 12, 12' for fastening the base 11 to the respective side guide 8, said fastening means being adapted to be engaged in a respective seat 13, 13' arranged on each side guide 8. Thereby, when the fastening means 12, 12' are engaged in the seats 13, 13', the locking pin 10 is inserted into an end recess, for example a substantially circular recess, defined by the pair of plates 5 in the normally closed state thereof. This end recess is defined by two end half-recesses 14, for example substantially semi-circular recesses (FIGS. 7b and 15), each end half-recess 14 being provided in a respective plate 5 of the pair of plates. In particular, each end half-recess 14 is made at an inner corner of the respective plate 5, considering the pair of plates.

This end recess can be in the shape of a cavity or a through hole defined by the pair of plates 5 in the normally closed state thereof.

If the rollers 60 indicated above are provided, in the normally closed state, a respective empty zone which accommodates the two rollers 60 is provided at the two ends of the pair of plates, the empty zone being arranged between the end recess adapted to house the locking pin 10 and the first pair of side recesses which defines a seat for the neck mold 4.

Each side guide 8 is provided with a housing 20 shaped to receive the base 11.

The plates 5 of each pair of plates are equal to each other and preferably are in the shape of a rectangular parallelepiped, with the longitudinal extension (along the axis X) being greater than both the width and the thickness of the plate.

A first embodiment of the invention provides that the fastening means be a quick coupling device 12 adapted to engage in the respective seat 13 provided in the housing or seat 20 of the side guide 8. By using this first embodiment, it advantageously is not required to use external tools for disassembling and assembling the pairs of plates.

This quick coupling device 12, that is an alternative to using screws, can be of the quarter-turn type, preferably provided with a knob 17 for a rotation thereof. For example, one-touch fastening elements can be used which, in addition to the quarter-turn type, can be of the knob-locking, button-locking, ball-lock clamping and magnet-lock clamping pin type.

In this first embodiment, the quick coupling device 12 of the quarter-turn type, can comprise a locking bolt 15, or simply bolt, projecting from the base 11 on the same side as the locking pin 10, and the seat 13 comprises an opening 16 (FIGS. 7b and 15) adapted to be crossed by an end portion of the bolt 15.

Preferably, the end portion of the bolt 15 is provided with side projections 26, for example two side projections 26 arranged opposite to each other. In this case, the opening 16 has such a shape as to be crossed by the side projections 26 of the bolt. Bolt 15 can be integrally fastened to a knob 17, which projects from the side of the base 11 opposite to the side from which the locking pin 10 projects, to rotate the quick coupling device 12. If the side projections 26 are provided, once the end portion of the bolt 15 has crossed the opening 16, rotating the knob 17 by a quarter turn makes the side projections 26 to constrain the locking system, and therefore the pair of plates 5 by means of the locking pin 10, to the side guide 8.

The knob 17 instead is turned by 90° and lowered to unlock the pair of plates 5. The locking pin 10 frees the end recess of the pair of plates 5 by pulling the knob 17 downwards.

Preferably, the base 11 has a first portion, provided with the quick coupling device 12, which is wider with respect to a second portion, or end portion, thereof, provided with the locking pin 10.

In a first variant of this first embodiment of the invention, shown in FIGS. from 4 to 7b, the base 11 of the locking system 9 is provided with at least two centering pins 18, preferably only two centering pins 18, that are parallel to each other and projecting from the base 11 on the same side from which the locking pin 10 projects, are arranged on opposite sides with respect to the quick coupling device 12, and are adapted to be inserted into respective holes 19 provided on the housing 20 of the side guide 8. Advantageously, the correct centering of the locking pin 10 is ensured by the centering pins 18.

In this first variant, the base 11 has a first portion, provided with the quick coupling device 12 and with the two centering pins 18, which is wider with respect to a second portion, or end portion, thereof, provided with the locking pin 10.

In a second variant of said first embodiment of the invention, shown in FIGS. 8 and 9, the base 11 of the locking system 9 is provided with only one centering pin 18, projecting from the base 11 on the same side from which the locking pin 10 projects, and adapted to be inserted into a corresponding hole 19 provided on the housing 20 of the side guide 8. This single centering pin 18 can be aligned with the locking pin 10 and with the quick coupling device 12; preferably, the axes of the locking pin 10, centering pin 18 and bolt 15 of the quick coupling device 12 lie on a single plane. In particular, as shown, the quick coupling device 12 can be arranged between the centering pin 18 and the locking pin 10.

In this second variant, the base 11 has a first portion, provided with the quick coupling device 12 and with the single centering pin 18, which is wider with respect to a second portion, or end portion, thereof, provided with the locking pin 10. Advantageously, respective coupling areas 42, 43, shown in FIGS. 8 and 9, can be provided on the side surfaces (i.e. on the thickness) of the first portion of the base 11 and on the corresponding side surfaces of the housing 20 of the side guide 8. These coupling areas 42, 43, matching with each other, ensure the perfect centering of the locking pin 10 in the absence of a second centering pin 18.

Similar coupling areas 42, 43 can also be provided on the side surfaces of the second portion of the base 11 and on the corresponding side surfaces of the housing 20, respectively.

In a third variant of said first embodiment of the invention, shown in FIGS. from 12 to 15, the base 11 of the locking system 9 can slide along at least two guide elements 28, preferably only two guide elements 28, parallel to each other and fastened to the respective side guide 8.

Advantageously, these guide elements 28 define a minimum stroke of the locking system 9, and therefore of the base 11 thereof, so as to disengage the locking pin 10 from the end recess of the pair of longitudinal plates 5.

Figure 14:
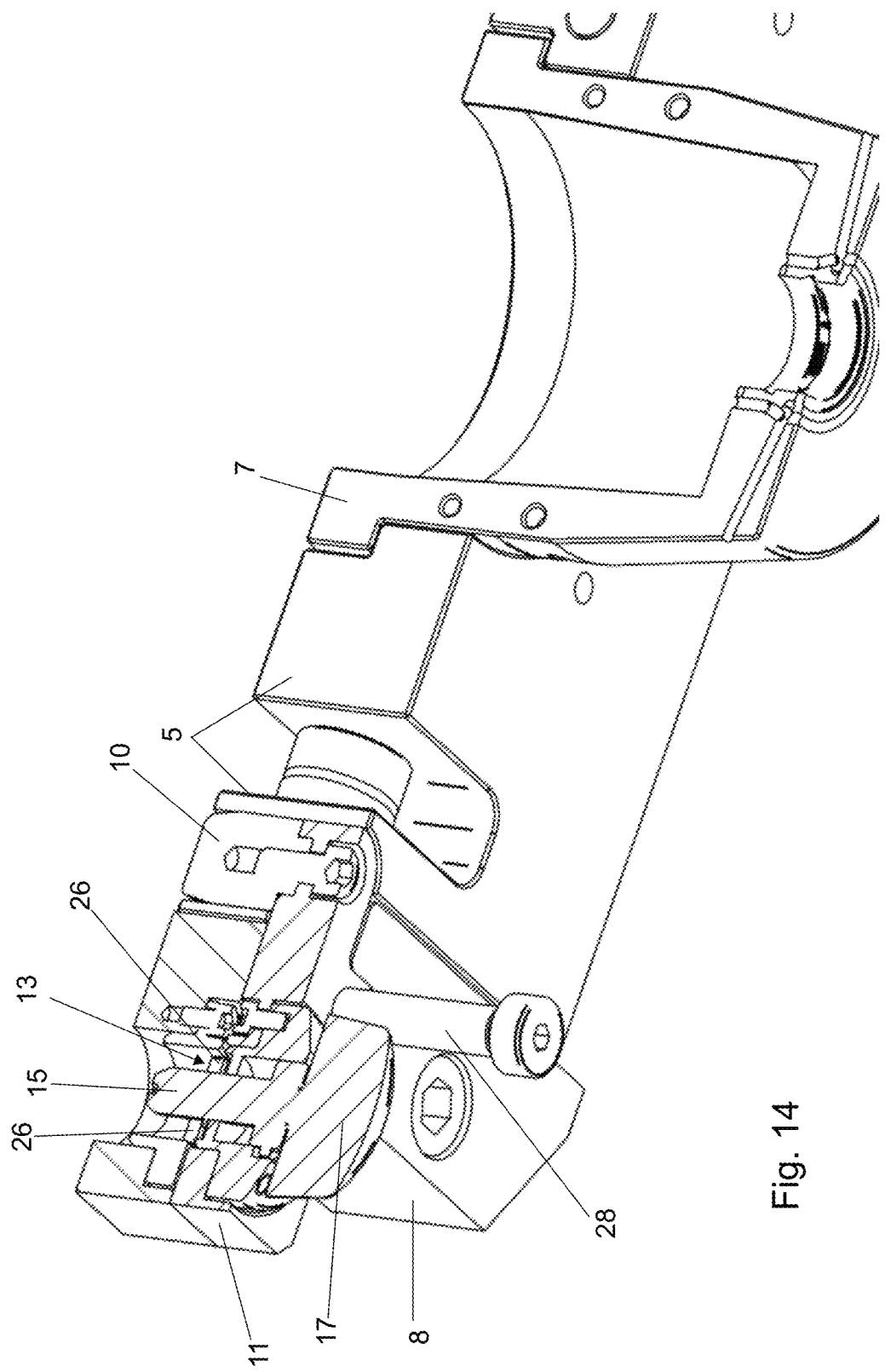
FIGS. 14 and 15 show a sectional view of the fourth variant of FIG. 13, in two corresponding positions.

FIG. 14 shows the position in which the quick coupling device 12 is engaged in the seat 13 provided in the housing of the side guide 8, and in which the locking pin 10 is inserted into the end recess of the pair of bars 5.

Figure 15:
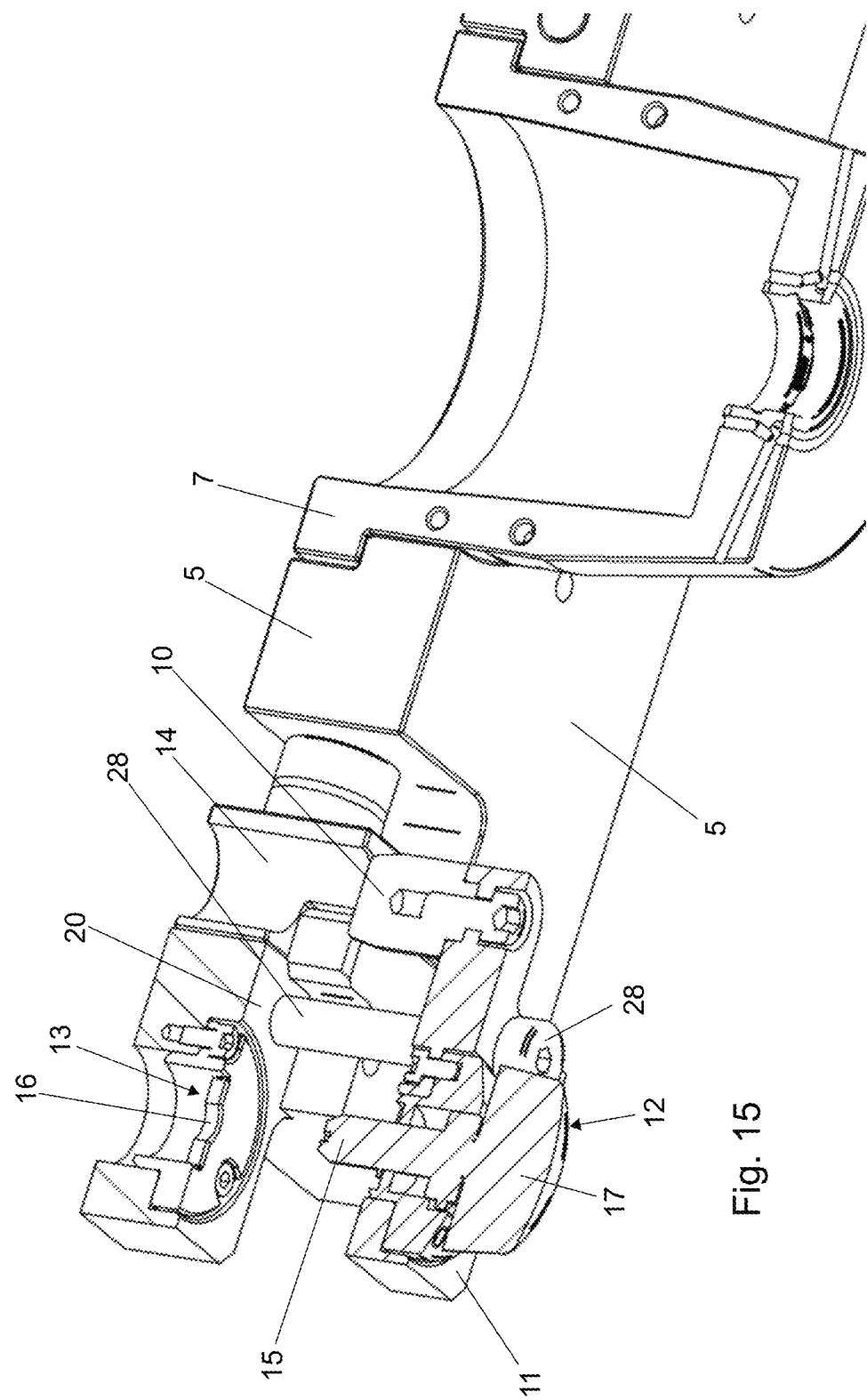

FIG. 15 instead shows the end-of-stroke position that the locking system 9 reaches after the disengagement of the quick coupling device 12 from the seat 13, and which allows the locking pin 10 to free the end recess of the pair of bars 5, which therefore can be extracted laterally by sliding it on the shoulder 38 of the side guide 8.

Advantageously, this variant allows the operations of changing the pair of bars 5 to be facilitated, allowing the locking system 9 to remain constrained to the respective side guide 8 also in the unlocking position of the plates 5. At the same time, the guide elements 28 ensure the correct centering of the locking pin 10.

Preferably, these guide elements 28 are collar screws, or shoulder screws with collar, fastened to the respective side guide 8, in particular to the zone accommodating the base 11, and crossing respective through holes provided in the base 11.

Figure 13:
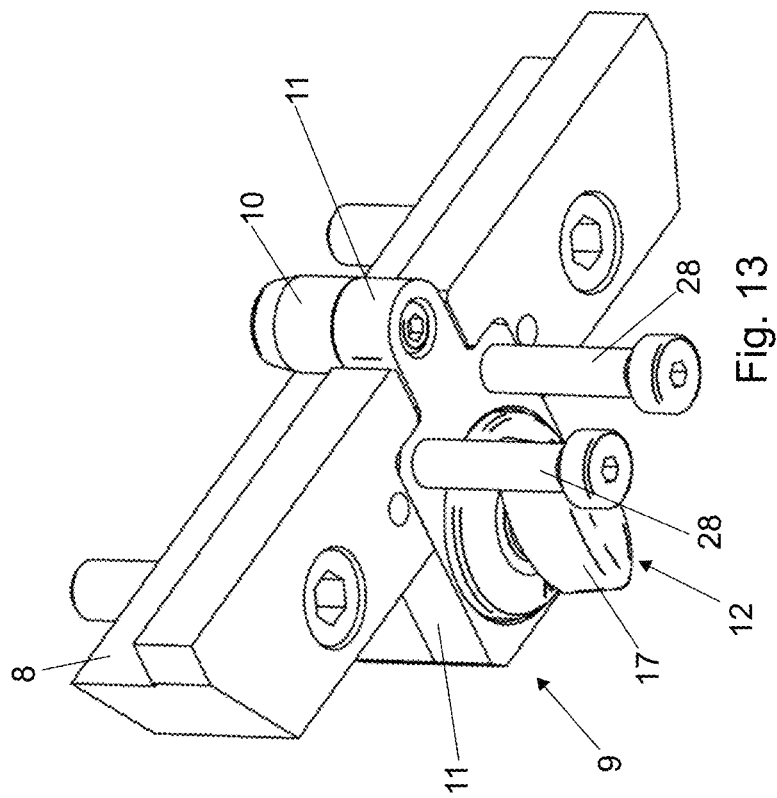
FIGS. 12 and 13 show two perspective views of a fourth variant of said part of the apparatus of the invention.
Figure 12:
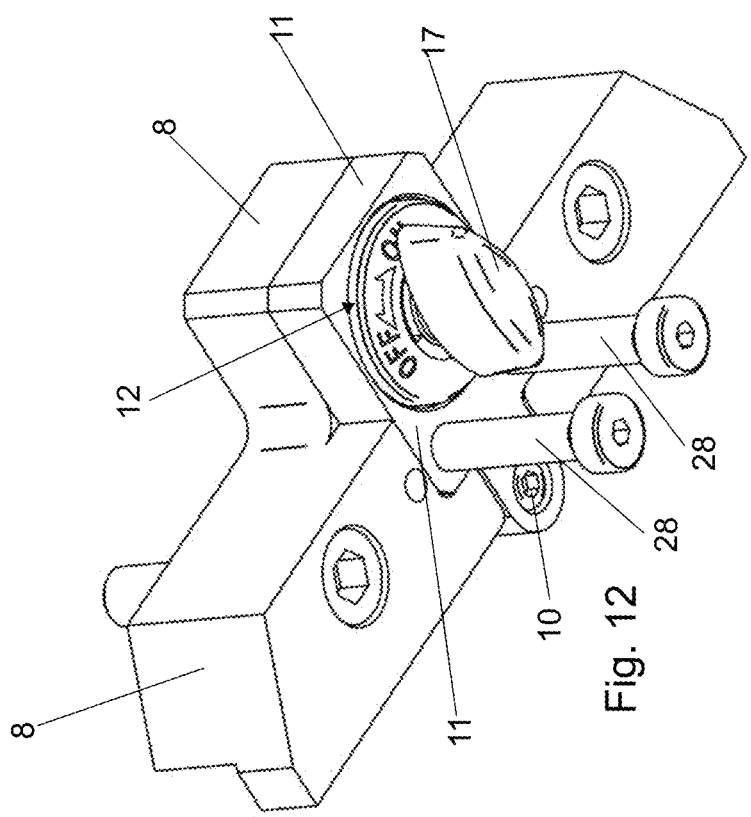

In FIGS. 12 and 13, these guide elements 28 are arranged in a position between the locking pin 10 and the quick coupling device 12.

In this third variant, the base 11 has a first portion, provided with the quick coupling device 12 and with through holes for the guide elements 28, which is wider with respect to a second portion, or end portion, thereof, provided with the locking pin 10.

A fourth variant of said first embodiment of the invention, shown in FIGS. 16 and 17, is similar to the third variant, with the difference that the two guide elements 28 are arranged laterally with respect to the quick coupling device 12, at opposite sides of said quick coupling device 12, and not in an intermediate position between the locking pin 10 and the quick coupling device 12.

Advantageously, elastic devices can be provided in this fourth variant, the elastic devices being adapted to facilitate the disengagement of the locking system 9 from the pair of longitudinal plates 5, i.e. the disengagement of the locking pin 10 from the end recess of the pair of longitudinal plates 5. For example, two further guide elements 28' can be provided, parallel to each other, arranged on opposite sides with respect to the quick coupling device 12, fastened to the base 11 and crossing respective through holes 40 of the side guide 8. A spring 41, for example a helical spring, is arranged coaxially outside each further guide element 28' and is fastened both to the base 11 and to the side guide 8, whereby the spring 41 is compressed in a locking position of the pair of plates 5 to the pair of side guides 8, while in the unlocking step, the spring 41 facilitates the disengagement of the locking pin 10 from the end recess of the pair of longitudinal plates 5.

In this fourth variant, the base 11 has a first portion, provided with the quick coupling device 12, through holes for the guide elements 28 and further guide elements 28', said first portion being wider with respect to a second portion, or end portion, of the base that is provided with the locking pin 10.

A second embodiment of the invention provides that the fastening means be a screw 12' adapted to be screwed in the respective seat 13' (FIG. 11) provided in the housing or seat 20 of the side guide 8.

Preferably, the base 11 of the locking system 9 is provided with a knob 17', simply to hold the system itself when screw 12' is screwed or unscrewed. When provided, the knob 17' can be fastened to the base 11 so as to project from the side of the base 11 opposite to the side from which the locking pin 10 projects.

In a first variant of this second embodiment, shown in FIGS. 10 and 11, the base 11 of the locking system 9 is provided with only one centering pin 18, projecting from the base 11 on the same side from which the locking pin 10 projects, and adapted to be inserted into a corresponding hole (not shown) provided on the housing 20 of the side guide 8. This single centering pin 18 can be aligned with the locking pin 10 and with the screw 12'; preferably, the axes of the locking pin 10, centering pin 18 and screw 12' lie on a single plane. In particular, as shown, the screw 12' can be arranged between the centering pin 18 and the locking pin 10.

By way of explanation, the knob 17' can be arranged on the base 11, between the screw 12' and the centering pin 18.

In this variant of FIGS. 10 and 11, the base 11 can have both thickness and width substantially constant for the whole longitudinal extension thereof. Advantageously, respective coupling areas 42, 43, shown in FIGS. 10 and 11, can be provided on the side surfaces (i.e. on the thickness) of the base 11 and on the corresponding side surfaces of the housing 20 of the side guide 8. These coupling areas 42, 43, matching with each other, ensure the perfect centering of the locking pin 10 in the absence of a second centering pin 18.

In a second variant of said second embodiment, shown in FIGS. 18 and 19, the base 11 of the locking system 9 can slide along at least two guide elements 28, preferably only two guide elements 28, parallel to each other and fastened to the respective side guide 8.

Advantageously, these guide elements 28 define a stroke of the locking system 9, and therefore of the base 11 thereof, so as to disengage the locking pin 10 from the end recess of the pair of longitudinal plates 5.

FIG. 18 shows the position in which the screw 12' is screwed in the seat 13' provided in the housing of the side guide 8, and in which the locking pin 10 is inserted in the end recess (not shown) of the pair of bars 5.

FIG. 19 instead shows the end-of-stroke position that the locking system 9 reaches after the screw 12' is unscrewed from the seat 13' (not shown) and which allows the locking pin 10 to free the end recess of the pair of bars 5, which therefore can be extracted laterally, by sliding on the shoulder 38 of the side guide 8.

Preferably, these guide elements 28 are collar screws, or shoulder screws with collar, fastened to the respective side guide 8, in particular to the zone accommodating the base 11, and crossing respective through holes provided in the base 11.

By way of explanation, as shown, the two guide elements 28 are arranged laterally with respect to the screw 12', at opposite sides of the screw 12', or are arranged (variant not shown) in an intermediate position between locking pin 10 and screw 12'.

By way of explanation, the knob 17' can be arranged on the base 11, between the screw 12' and the locking pin 10.

Advantageously, elastic devices can be provided also in this second variant of the second embodiment, the elastic devices being adapted to facilitate the disengagement of the locking system 9 from the pair of longitudinal plates 5, i.e. the disengagement of the locking pin 10 from the end recess of the pair of longitudinal plates 5.

In this variant of FIGS. 18 and 19, the base 11 can have a first portion, provided at least with the screw 12' and with through holes for the guide elements 28, said first portion being wider with respect to a second portion, or end portion, of the base which is provided with the locking pin 10 and, possibly, the knob 17'.

Figure 20:
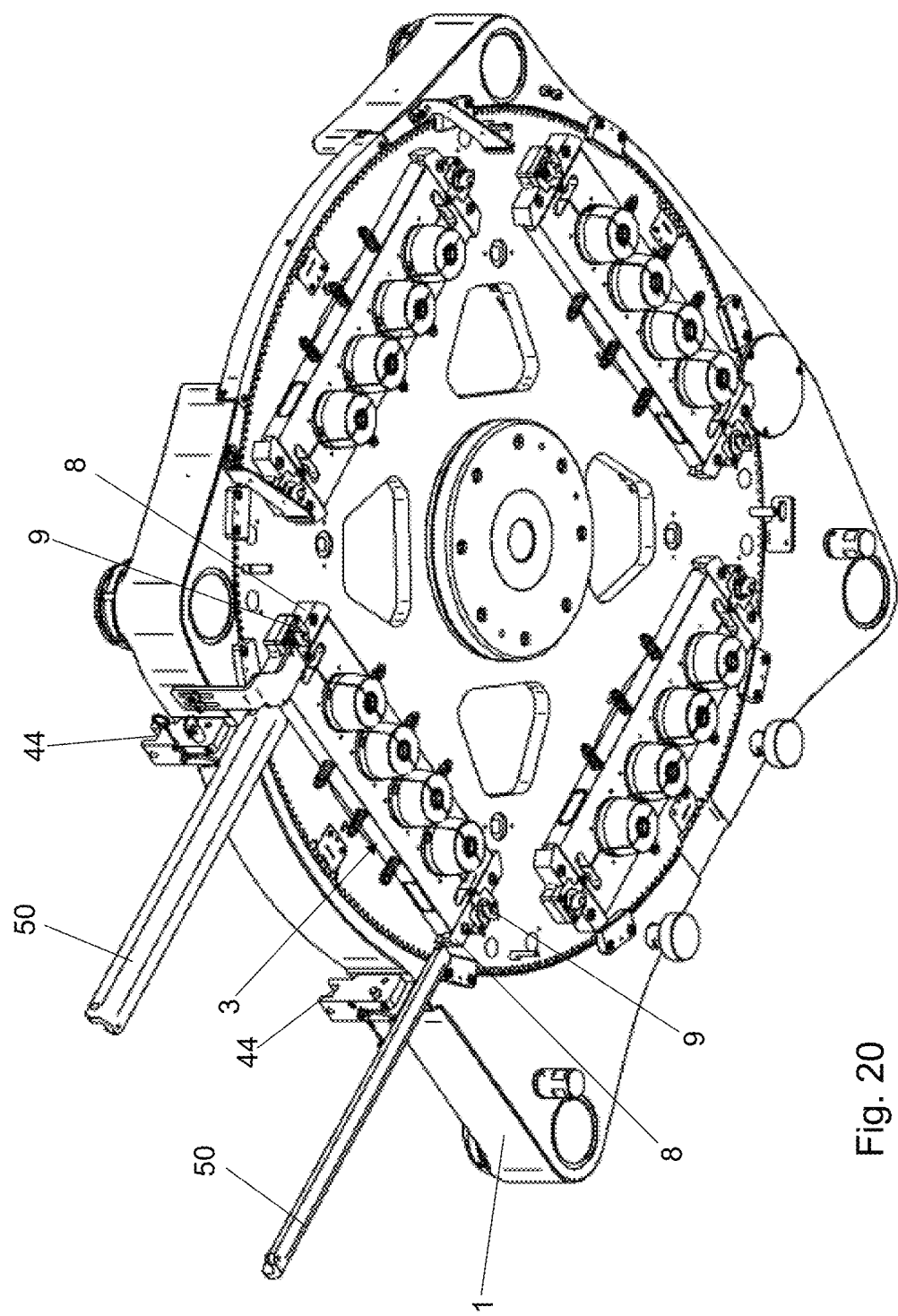
FIGS. 20 and 21 show perspective views of two steps for extracting an apparatus of the invention from a rotating device of the molding machine.
Figure 21:
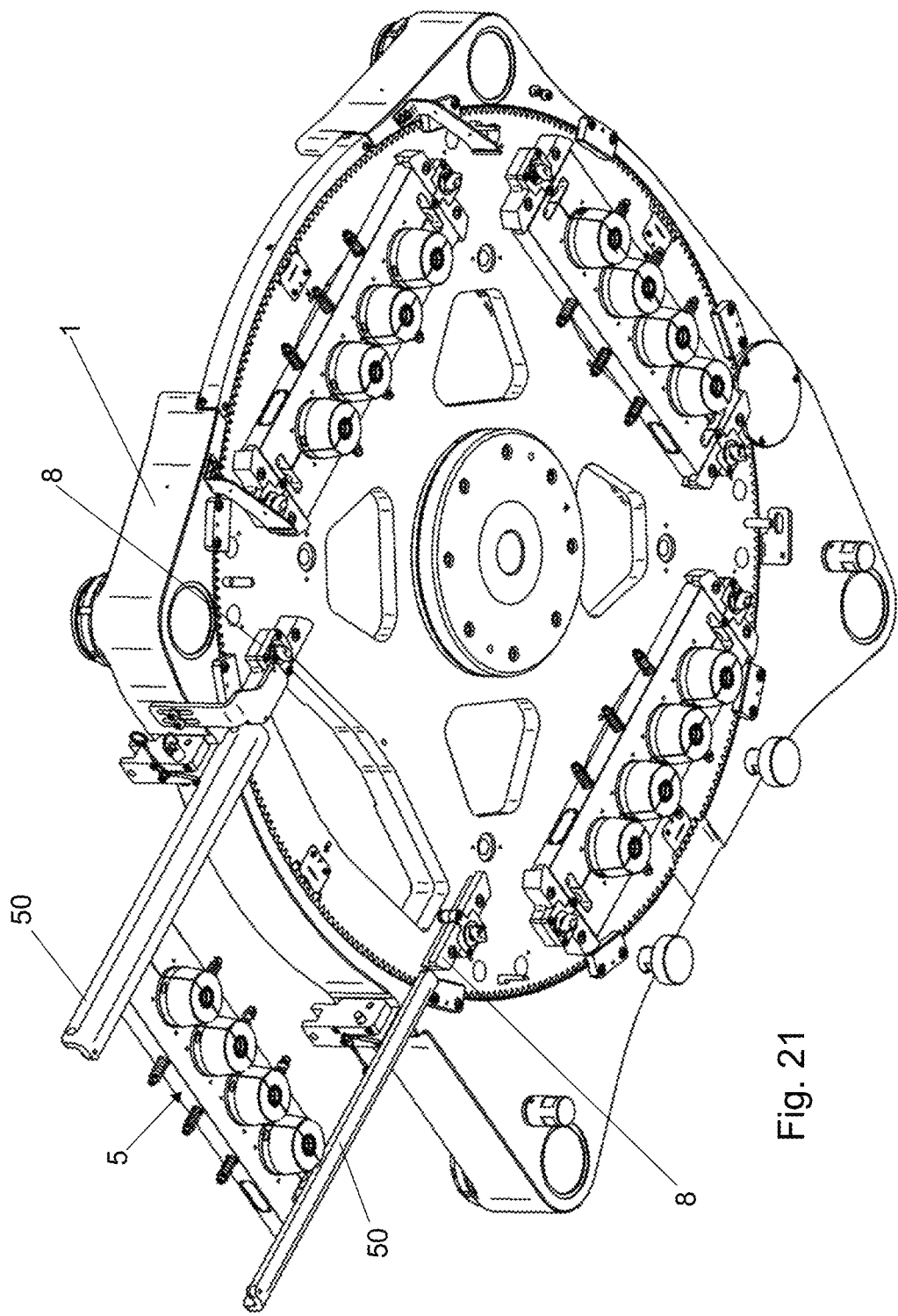

Advantageously, the injection blow molding machine comprising the support apparatuses 3 according to the present invention can be provided with at least one pair of side extraction guides 50, shown in FIGS. 20 and 21.

These side extraction guides 50 are longitudinal guides which can be fastened to the fixed base plate 1 so as to be aligned with respective side guides 8 of a corresponding support apparatus 3. Thereby, once the pair of plates 5 is unlocked by means of the locking system 9, the pair of plates 5 can be laterally extracted, sliding first on the side guides 8 of the support apparatus 3 and immediately after on the side extraction guides 50.

In a similar manner, the insertion of a new pair of plates 5 can occur by means of a sliding first on the side extraction guides 50 and then on the corresponding side guides 8, to then be locked by means of the locking pins 10 of the locking systems 9.

Once the operations of changing the pair of plates, or simply changing the lip-holder bar, are complete, the side extraction guides 50 are detached from the fixed base plate 1. Optionally, there can be provided supports 44, where the side extraction guides 50 can be stored, on at least one side of the fixed base plate 1, so as to have said side extraction guides quickly available when required. Preferably, the guides 50 are stored in the supports 44 with the longitudinal axis thereof substantially perpendicular to the position thereof when they are aligned with the side guides 8. In a variant, there are provided just as many pairs of side extraction guides 50 as there are support apparatuses 3, and therefore the pairs of side guides 8 fastened to the rotating device 2.

A method for replacing a pair of plates 5 of a support apparatus 3 of an injection blow molding machine, like the one described above, is described below. The method comprises the following steps:
a) unlocking the pair of plates 5 from the corresponding side guides 8 by means of the respective locking systems 9;
b) extracting the pair of plates 5 transversely to the longitudinal axis X thereof by sliding it on the side guides 8;
c) inserting a new pair of plates 5 by sliding it on the side guides 8 transversely to the longitudinal axis X thereof;
d) locking the new pair of plates 5 to the corresponding side guides 8 by means of the respective locking systems 9.

If the side extraction guides 50 are used, the extraction of the plates is completed in step b) by sliding the pair of plates 5 on the respective side extraction guides 50, which are arranged aligned to the corresponding side guides 8. The pair of plates 5 to be extracted is, thus, slid first on the side guides 8 and then on the side extraction guides 50, which are long enough to allow the pair of plates 5 to occupy a position which is completely external to the fixed base plate 1. At this point, once the pair of bars to be replaced is extracted, the insertion of the new pair of plates 5 in step c) occurs by first sliding said new pair of plates on the side extraction guides 50 and then on the corresponding side guides 8.

In the case of the above-described variants of the first embodiment of the invention, i.e. the one provided with the quick coupling device 12, in step a), at each end of the pair of plates 5, the quick coupling device 12 is operated to be disengaged from the seat 13, whereby the locking pin 10 can be disengaged from the respective end recess of the pair of plates 5 in the normally closed state thereof.

Instead in step d), at each end of the pair of plates 5, the quick coupling device 12 is operated to be engaged in the seat 13, whereby the locking pin 10 engages in said end recess of the new pair of plates 5.

Considering instead the above-described variants of the second embodiment of the invention, i.e. the one provided with the fastening screw 12', in step a), at each end of the pair of plates 5, the screw 12' is unscrewed to be disengaged from the seat 13', whereby the locking pin 10 can be disengaged from the respective end recess of the pair of plates 5 in the normally closed state thereof.

Instead in step d), at each end of the pair of plates 5, the screw 12' is screwed to be engaged in the seat 13', whereby the locking pin 10 is engaged in said end recess of the new pair of plates 5.

The invention claimed is:

1. A support apparatus for supporting at least one neck mold of a plastic container, the support apparatus being adapted to be fastened to a lower surface of a rotating device of an injection blow molding machine of plastic containers, said support apparatus comprising:
   a pair of plates defining a longitudinal axis, said plates being adjacent to each other along the longitudinal axis and separable from each other transversely to said longitudinal axis, and being kept adjacent in a normally closed state by elastic means, wherein each plate is provided with at least one respective recess positioned so that, when the plates of said pair of plates are in the normally closed state, at least two recesses are adjacent to each other along said longitudinal axis so as to define a seat for a neck mold comprising a pair of split molds, each split mold being capable of being accommodated in a recess of a respective plate; and
   a pair of side guides transverse to said longitudinal axis, adapted to be fastened to said lower surface of the rotating device, each side guide being adapted to support a respective end of the pair of plates from the bottom,
   wherein the side guides are provided with a respective locking system for locking or unlocking the pair of plates to/from said pair of side guides so that, in an unlocking position, the pair of plates can be extracted transversely to the longitudinal axis thereof by sliding on the side guides,
   wherein said locking system comprises a base provided, at an end thereof, with a locking pin protruding from said base, and with fastening means for fastening said base to the respective side guide, said fastening means being adapted to be engaged in a respective seat arranged on each side guide, and
   whereby, when the fastening means is engaged in the seat, the locking pin is inserted into an end recess of the pair of plates in the normally closed state thereof, said end recess being defined by two end half-recesses, each end half-recess being provided in a respective plate of the pair of plates.

2. The apparatus according to claim 1, wherein said fastening means is a quick coupling device adapted to be engaged in the respective seat, or wherein said fastening means is a screw adapted to be screwed into the respective seat.

3. An apparatus according to claim 2, wherein said quick coupling device is of the quarter-turn type.

4. The apparatus according to claim 2, wherein said quick coupling device comprises a locking bolt projecting from said base on the same side as the locking pin, and wherein said seat comprises an opening adapted to be crossed by an end portion of said locking bolt.

5. The apparatus according to claim 1, wherein the side guide is provided with a housing shaped to receive the base.

6. The apparatus according to claim 1, wherein the base is provided with at least one centering pin, projecting from said base on the same side from which the locking pin projects, and adapted to be inserted into a corresponding housing provided on the side guide.

7. The apparatus according to claim 1, wherein the base is provided with at least two parallel centering pins projecting from said base on the same side from which the locking pin projects, arranged on opposite sides with respect to the fastening means and adapted to be inserted into a respective housing provided on the side guide.

8. The apparatus according to claim 1, wherein the base is adapted to slide along at least two guide elements, parallel to each other and fastened to the respective side guide, said at least two guide elements defining a stroke of the locking system so as to disengage the locking pin from the end recess of the pair of longitudinal plates.

9. The apparatus according to claim 8, wherein said at least two guide elements are collar screws crossing respective through holes provided in the base.

10. The apparatus according to claim 8, wherein said at least two guide elements are arranged in a position between the locking pin and the fastening means, or are arranged laterally with respect to the fastening means, at opposite sides of said fastening means.

11. The apparatus according to claim 10, wherein elastic devices are provided, adapted to facilitate the disengagement of the locking system from the pair of plates, i.e. the disengagement of the locking pin from the end recess of the pair of plates.

12. An injection blow molding machine for plastic containers, the machine comprising:
   a fixed base plate;
   a rotating device arranged below and movably supported by said fixed base plate, and
   at least two support apparatuses according to claim 1 removably fastened to a lower surface of said rotating device,
   wherein the rotating device is adapted to rotate in an intermittent manner to transport, in sequence, each support apparatus at a first station for injection-molding plastic preforms and at a second station for blow-molding containers from said preforms, and
   wherein each support apparatus comprises at least one neck mold comprising a pair of split molds, each split mold of the pair of split molds being accommodated in a recess of a respective plate of the pair of plates, whereby the split molds are adjacent to each other along said longitudinal axis when the plates of said pair of plates are in the normally closed state.

13. The machine according to claim 12, wherein at each side guide there is provided a respective side extraction guide, which can be fastened to the fixed base plate so as to be aligned to the corresponding side guide.

14. A method for replacing a pair of plates of a support apparatus of an injection blow molding machine according to claim 12, said method comprising the following steps:
   a) unlocking the pair of plates from the corresponding side guides by means of the respective locking systems;
   b) extracting the pair of plates transversely to the longitudinal axis thereof by sliding said pair of plates on the side guides;
   c) inserting a new pair of plates by sliding said new pair of plates on said side guides transversely to the longitudinal axis thereof; and
   d) locking the new pair of plates to the corresponding side guides by means of the respective locking systems.

15. The method according to claim 14, wherein each locking system comprises a base provided with a locking pin, projecting from said base, and with a quick coupling device adapted to be engaged in a respective seat arranged on the corresponding side guide,
   wherein, in step a), at each end of the pair of plates, the quick coupling device is operated to be disengaged from the respective seat, whereby the locking pin can be disengaged from an end recess of the pair of longitudinal plates in the normally closed state thereof, said end recess being defined by two end half-recesses, each end half-recess being provided in a respective plate of the pair of longitudinal plates; and wherein, in step d), at each end of the pair of plates, the quick coupling device is operated to be engaged in the respective seat, whereby the locking pin engages in said end recess of the new pair of longitudinal plates.

16. The method according to claim 14, wherein each locking system comprises a base provided with a locking pin, projecting from said base, and with a fastening screw adapted to be screwed in a respective seat arranged on the corresponding side guide,
   wherein, in step a), at each end of the pair of plates, the screw is unscrewed to be disengaged from the respective seat), whereby the locking pin can be disengaged from an end recess of the pair of longitudinal plates in the normally closed state thereof, said end recess being defined by two end half-recesses, each end half-recess being provided in a respective plate of the pair of longitudinal plates; and
   wherein, in step d), at each end of the pair of plates, the screw is screwed to be engaged in the respective seat, whereby the locking pin is engaged in said end recess of the new pair of longitudinal plates.

17. The method according to claim 14, wherein, in step b), the extraction is completed by also sliding the pair of plates on respective side extraction guides, each side extraction guide being fastened to the fixed base plate and aligned to the corresponding side guide.

18. The method according to claim 14, wherein, in step c), the insertion of the new pair of plates occurs by first sliding said new pair of plates on said side extraction guides and then on the corresponding side guides.

* * * * *